United States Patent
Hertel (10) Patent No.: US 10,015,012 B2
(45) Date of Patent: Jul. 3, 2018

(54) PRECALCULATING HASHES TO SUPPORT DATA DISTRIBUTION

(71) Applicant: Red Hat, Inc., Raleigh, NC (US)

(72) Inventor: Christopher R. Hertel, Saint Paul, MN (US)

(73) Assignee: Red Hat, Inc., Raleigh, NC (US)

( * ) Notice: Subject to any disclaimer, the term of this patent is extended or adjusted under 35 U.S.C. 154(b) by 463 days.

(21) Appl. No.: 13/934,535

(22) Filed: Jul. 3, 2013

(65) Prior Publication Data

US 2015/0012745 A1    Jan. 8, 2015

(51) Int. Cl.
| | |
|---|---|
| H04L 9/32 | (2006.01) |
| H04N 21/24 | (2011.01) |
| H04N 21/63 | (2011.01) |
| H04N 21/647 | (2011.01) |
| H04N 21/8358 | (2011.01) |
| G06F 17/30 | (2006.01) |
| H04L 29/08 | (2006.01) |
| G06F 21/64 | (2013.01) |

(52) U.S. Cl.
CPC ...... *H04L 9/3236* (2013.01); *G06F 17/30097* (2013.01); *G06F 21/645* (2013.01); *H04L 67/06* (2013.01); *H04L 67/2814* (2013.01); *H04N 21/2402* (2013.01); *H04N 21/632* (2013.01); *H04N 21/64738* (2013.01); *H04N 21/8358* (2013.01); *H04L 2209/60* (2013.01)

(58) Field of Classification Search
CPC ... H04L 9/3236; H04L 67/2814; H04L 67/06; H04L 2209/60; G06F 17/30097; G06F 21/645; G06F 17/30; H04N 21/00
See application file for complete search history.

(56) References Cited

U.S. PATENT DOCUMENTS

| | | | | |
|---|---|---|---|---|
| 7,373,520 B1 * | 5/2008 | Borthakur | ......... | G06F 17/30097 705/51 |
| 8,943,315 B1 * | 1/2015 | Ubl | ............ | H04L 9/3236 707/644 |
| 2005/0108242 A1 * | 5/2005 | Kalker | ............ | G06F 17/30038 |
| 2008/0022135 A1 * | 1/2008 | Gaya | ............ | H04L 29/06 713/193 |
| 2008/0281950 A1 * | 11/2008 | Wald | ............ | H04L 67/1063 709/223 |
| 2009/0006853 A1 * | 1/2009 | Li | ............ | H04L 63/0428 713/176 |
| 2009/0327505 A1 * | 12/2009 | Rao | ............ | H04L 9/3236 709/230 |
| 2010/0106691 A1 * | 4/2010 | Preslan | ............ | G06F 11/1453 707/674 |

(Continued)

*Primary Examiner* — Michael Pyzocha
(74) *Attorney, Agent, or Firm* — Lowenstein Sandler LLP (57) ABSTRACT

A content server precomputes a hash value corresponding to content stored by the server. The server receives a request for the hash value from a first client device and provides the hash value to the first client device. The server receives a request for the content corresponding to the hash value from the first client device and provides the content to the first client device. The server receives a request for the hash value from a second client device and provides the hash value to the second client device, wherein the second client device obtains the content from the first client device or a local cache over a higher bandwidth connection.

17 Claims, 6 Drawing Sheets

(56) References Cited

U.S. PATENT DOCUMENTS

| | | | | |
|---|---|---|---|---|
| 2011/0016220 A1* | 1/2011 | Desai | H04L 67/104 | 709/230 |
| 2011/0087690 A1* | 4/2011 | Cairns | G06F 17/30097 | 707/769 |
| 2011/0196941 A1* | 8/2011 | Macwan | H04N 21/63 | 709/217 |
| 2011/0238828 A1* | 9/2011 | Grigsby | H04L 67/104 | 709/224 |
| 2011/0314070 A1* | 12/2011 | Brown | G06F 17/30141 | 707/827 |
| 2013/0138775 A1* | 5/2013 | Shah | H04L 12/584 | 709/219 |
| 2013/0268614 A1* | 10/2013 | Bose | G06F 17/3048 | 709/213 |
| 2014/0149556 A1* | 5/2014 | Pang | H04L 67/10 | 709/219 |
| 2014/0156866 A1* | 6/2014 | Kallstrom | H04L 67/06 | 709/232 |
| 2014/0173027 A1* | 6/2014 | Kappes | H04L 67/1097 | 709/217 |

\* cited by examiner

PRECALCULATING HASHES TO SUPPORT DATA DISTRIBUTION

TECHNICAL FIELD

This disclosure relates to the field of data distribution and, in particular, to precalculating hashes to support data distribution.

BACKGROUND

Modern computing systems have a general need to transfer large quantities of data from one machine to another, often over long distances. It has long been a problem in computing that transferring large quantities of data is a time consuming and costly process. Conventional systems have addressed the problems of data transfer in several ways. One technique includes data compression. Generally, data compression involves encoding information using fewer bits than the original representation. Lossless compression reduces bits by identifying and eliminating statistical redundancy, while lossy compression reduces bits by identifying marginally important information and removing it. Compression is useful because it helps reduce resource usage, such as data storage space or transmission capacity. However, compression involves a significant amount of data analysis and this extra processing imposes computational or other costs.

Another approach includes increasing the available bandwidth used to transfer the data. Bandwidth sometimes defines the net bit rate (or peak bit rate, information rate or physical layer useful bit rate), channel capacity, or the maximum throughput of a logical or physical communication path in a digital communication system. Thus, the speed of data transfer over the communication path is limited by the bandwidth. Increasing the bandwidth, however, may be very expensive, as it comes with the cost of interrupting or delaying other data transfers or adding to or even replacing the communication path.

A third technique used to address the problems of data transfer is the physical transport of storage media. In this case, the data one wishes to transfer is stored on storage media (e.g., one or more optical disks), which is physically delivered to the location of a second computer and loaded onto that computer. This can be a cheap method of data transfer with potentially a very high bandwidth, however, it can take significantly longer than transferring data in an electronic signal either wirelessly or over a wire, resulting in a very high latency.

Often times a user of a computing system must determine whether to place greater emphasis on the time it takes to transfer the data or the cost of transferring the data in a shorter amount of time. Many techniques in use today suffer adversely in one area or the other.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide an understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for precomputing hashes to support data distribution. In one embodiment, a content server maintains content that is to be distributed to various client devices upon request. Generally the clients may request the content directly from the content server, or may request a hash (e.g., fingerprint, checksum, or other bit string) corresponding to the desired content. In one embodiment, a data distributor on the server precomputes the hashes for the content maintained by the content server. By precomputing the hashes before they or the corresponding content is requested by a client device, the content server may reduce the number of transactions between client devices and the content server that need to occur before the benefits of the data distribution techniques described herein are realized.

In one embodiment, the data distribution flow begins with a request from a first client to the server for the hashes corresponding to desired content. If the hashes have not been precomputed, the server will not have the hashes and will instead return the whole content corresponding to the requested hashes. Thus, the first client will have the content, but not the hashes. In one embodiment, in response to that first request, the server will asynchronously compute the hashes for the content. Then, when a second request is received for the hashes (e.g., from a second client), the hashes will exist, and the server can return the hashes. The second client broadcasts a request to other clients within the same local network to determine if any other client has the content that matches the received hashes. If the second client is able to receive the content through the local network, it can preserve bandwidth to the server. While the first client has the content, it does not have the corresponding hashes so it does not have the mapping between the content and hashes and cannot respond to the request. The second client thus has to request and receive the content from the server. When a third client requests the hashes from the server, the server provides the hashes and the third client makes a local request for the corresponding content. Now the second client has both the content and the hashes, and thus can provide the content corresponding to the hashes to the third client over the local network. Thus, when the hashes are not precomputed prior to the first request for content, the bandwidth savings of transferring the content over the local network are not realized until the third request.

In another embodiment, when the first client retrieves the hashes and the content, as described above, the first client then notifies a cache node that it has the both content and hashes. The cache node, which may be for example a local server or other device on the local network, retrieves the hashes and content from the first client. The remaining clients on the local network, will then request the content from the cache node, after they have received the hashes from the content server. The other clients may be pointed toward the cache node based on a configuration file, a group policy, or some other mechanism.

When the data distributor on the server precomputes the hashes for the content maintained by the content server, the first client to make a request can receive the hashes and the content from the server. Then, when the second client receives the hashes from the server and broadcasts a request to other local clients for the corresponding content, the first client can provide the content to the second client directly over the local network. In another embodiment, the cache node can provide the content directly to the second client. This represents a significant savings compared to waiting until the first request to compute the hashes, as the second requesting client is able to realize the improved data distribution, rather than the third requesting client. Additional details of these data distribution techniques are described below.

Figure 1:
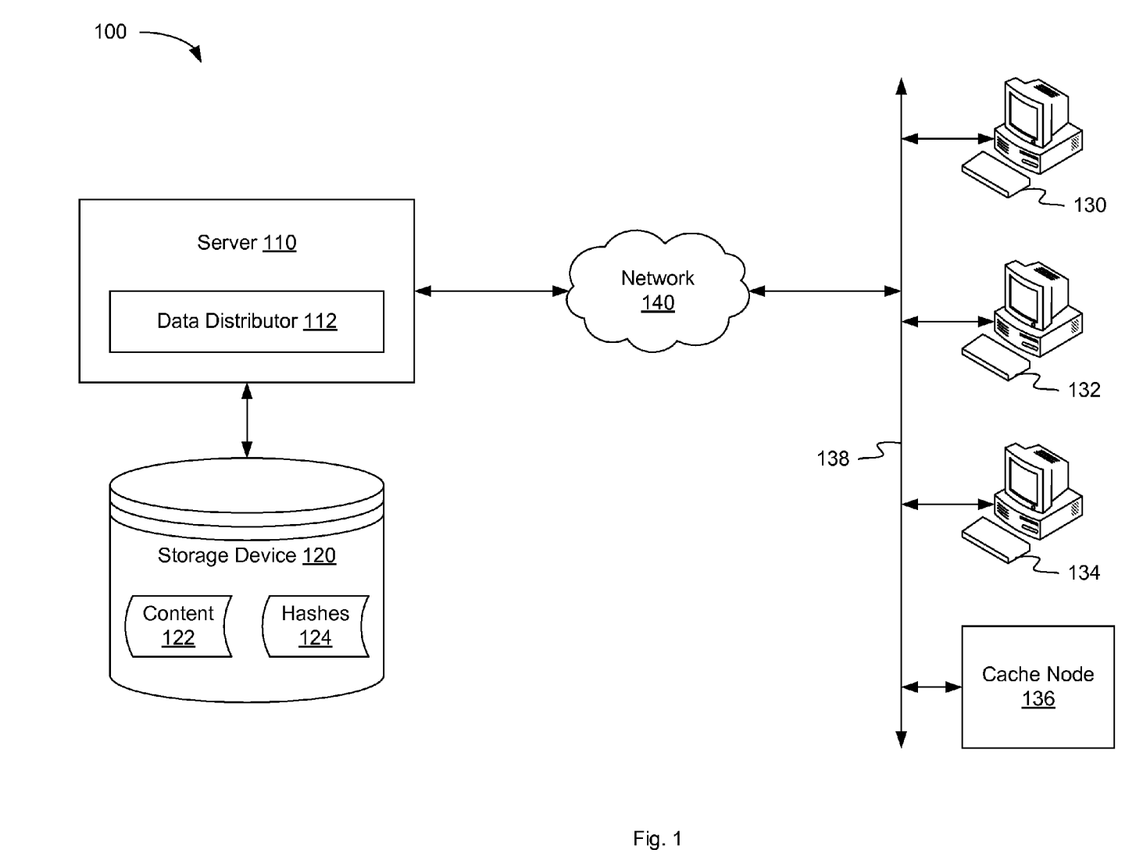
FIG. 1 is a block diagram illustrating a computing environment for precomputing hashes to support data distribution, according to an embodiment.

FIG. 1 is a block diagram illustrating a computing environment for precomputing hashes to support data distribution, according to an embodiment of the present invention. In one embodiment, network environment 100 includes content server 110 and networked client devices 130, 132 and 134. Content server 110 and networked client devices 130, 132, 134 may include, for example, computer system 600 of FIG. 6. Networked client devices 130, 132, 134 may be any devices connected to content server 110 through network 140, and may include for example, any computing device, client device, another server device, a user device, or some other device. Network 140 may be any type of data network configured to connect multiple computing devices, such as for example, a local area network (LAN), a wide area network (WAN), a global area network (GAN) such as the Internet, or a combination of such networks. In another embodiment, networked client devices 130, 132, 134 may have a direct connection to content server 110 and any other devices in the computing environment 100. The illustrated embodiment shows one content server 110 and three networked client devices 130, 132, 134, however, in other embodiments, there may be any number of content servers or networked client devices, and computing environment 100 may include additional and/or different devices.

In one embodiment, content server 110 may include data distributor 112. Data distributor 112 may receive and process requests for content 122 from networked client devices 130, 132, 134. Data distributor 112 may identify the requested content 122 by one or more hashes 124 corresponding to the content 122. The content 122 may include any data that is to be transferred over network 140, such as for example, software programs, software updates, media data, application data, or any other type of content. In one embodiment, the content may be a entire file or a chunk of a file, rather than the whole file. Hashes 124 may include hash values computed, using a cryptographic hash function, over all or a portion of content 122, that uniquely identify the content while being significantly smaller is size than content 122 itself. The hashes 124, using the hash function, may map back to the content 122 from which they were created. Any number of different algorithms may be used to generate hashes 124, as will be discussed below.

In one embodiment, content 122 and hashes 124 may be stored in storage device 120, which is connected to content server 110. Storage device 120 may include mass storage devices which can include, for example, flash memory, magnetic or optical disks, or tape drives, read-only memory (ROM); random-access memory (RAM); erasable programmable memory (e.g., EPROM and EEPROM); or any other type of storage medium.

In on embodiment, client devices 130, 132, 134 may be grouped locally in the same physical location. The client devices 130, 132, 134 may share a common network 138 (e.g., be on the same LAN), be part of a routed network including several LANs interconnected via a high-speed router, be at the same physical site or location, be contained within an enterprise such as an office, a university, or a corporate campus, or be within the same security domain.

In another embodiment, client devices 130, 132 134 may each be directly connected to one another or be configured in some other manner that allows them to communicate (e.g., over network 138) without having to transfer data across network 140. In one embodiment, the local network 138 may also include a cache node 136. Cache node 136 may be a specialized computer or other device designed to maintain a copy of content 122 and hashes 124 that are received by any of client devices 130, 132, 134 from content server 110. In another embodiment, each of client devices 130, 132, 134 may include a separate storage device (not shown) where the received content 122 and hashes 124 may be stored.

Figure 2:
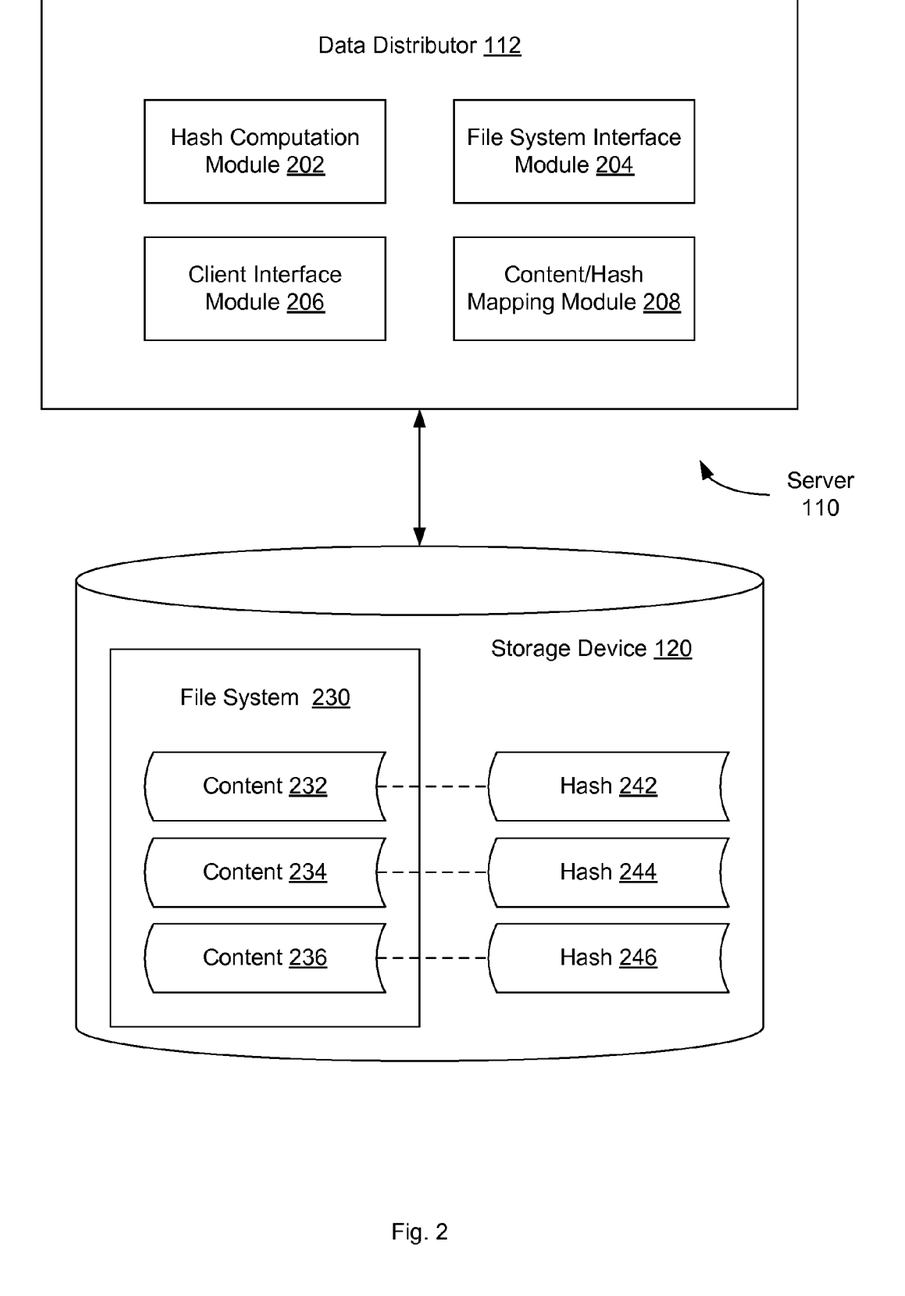
FIG. 2 is a block diagram illustrating a data distributor, according to an embodiment.

FIG. 2 is a block diagram illustrating a data distributor 112, according to an embodiment of the present invention. In one embodiment, data distributor 112 runs on content server 110, as shown in FIG. 1. In one embodiment, data distributor 112 includes hash computation module 202, file system interface module 204, client interface module 206, and content/hash mapping module 208. Data distributor 112 may be coupled to storage device 120 which includes file system 230 with content 232, 234, 236 and corresponding hashes 242, 244, 246, which may be separate from file system 230. In one embodiment, storage device 120 may be the same storage device discussed above with respect to FIG. 1.

In one embodiment, hash computation module 202 precomputes the hashes 242, 244, 246 corresponding to content 232, 234, 236 in file system 230. The hashes 242, 244, 246 may be, for example, the resulting value when a cryptographic hash function is applied to content 232, 234, 236. In one embodiment, hash computation module 202 may identify blocks of data within content 232 having a fixed size (e.g., 64 kilobytes). Each block may be identified by a starting memory address and a length. For example, if content 232 has a certain size (e.g., 640 KB), then content 232 may be divided into 10 blocks. If content 232 cannot be divided evenly based on the block size, the last block may have a size less than the fixed size (e.g., less than 64 KB). For each block, hash computation module 202 may calculate a hash value using a cryptographic hash algorithm, such as SHA-2, or another hash algorithm. Thus, there may be multiple hashes corresponding to each piece of content. In other embodiments, some other function may be used, such as a fingerprinting algorithm, checksum, or other function. The function may compute hashes over fixed or variable sized content.

In one embodiment, hash computation module 202 precomputes hashes 242, 244, 246 prior to data distributor 112 receiving a request for the hashes or for the corresponding content. In one embodiment, hash computation module 202 may be separate from file system 230 and thus, may not be able to compute the hashes immediately upon the content being stored in file system 230. In this case, hash computation module 202 may periodically scan the content in file system 230 to determine if there is any content for which a corresponding hash has not been created. However, if hash computation module 202 does have direct access to file system 230, then hash computation module 202 may compute the hash or hashes as part of the store operation in file system 230. In either case hashes 242, 244, 246 are precomputed prior to data distributor 112 receiving and requests for content. This is in contrast to other systems that wait until a request for the hash or corresponding content is received, before the hash is generated.

In one embodiment, client interface module 206 handles requests received from clients for content 232, 234, 236 or hashes 242, 244, 246 in storage device 120. For example, if a user of client device 130 wants to obtain content 232, client device 130 may issue a request for the hash 242 corresponding to content 232. That request may be received by client interface module 206. Upon receiving the request, client interface module 206 may forward the request to file system interface module 204.

In one embodiment, file system interface module 204 interacts with the content 232, 234, 236 in file system 230 and the corresponding hashes 242, 244, 246. For example, when a request for a hash 242 is received by client interface module 206, file system interface module 204 scans storage device 120 to determine if the hash 242 is present. If found, file system interface module 204 retrieves the hash 242 and provides a copy to client interface module 206. Content/hash mapping module 208 maintains a mapping between the hash 242 and the corresponding actual content 232. So if the request specifies a particular hash 242, content/hash mapping module 208 can identify the corresponding content 232, and file system interface module 204 can retrieve the content 232 from file system 230. In one embodiment, when hash computation module computes the hash 242, content/hash mapping module 208 creates the mapping so that the hash 242 may be retrieved at a later time. Client interface module 206 can then return the requested hash 242 to the client.

Figure 3:
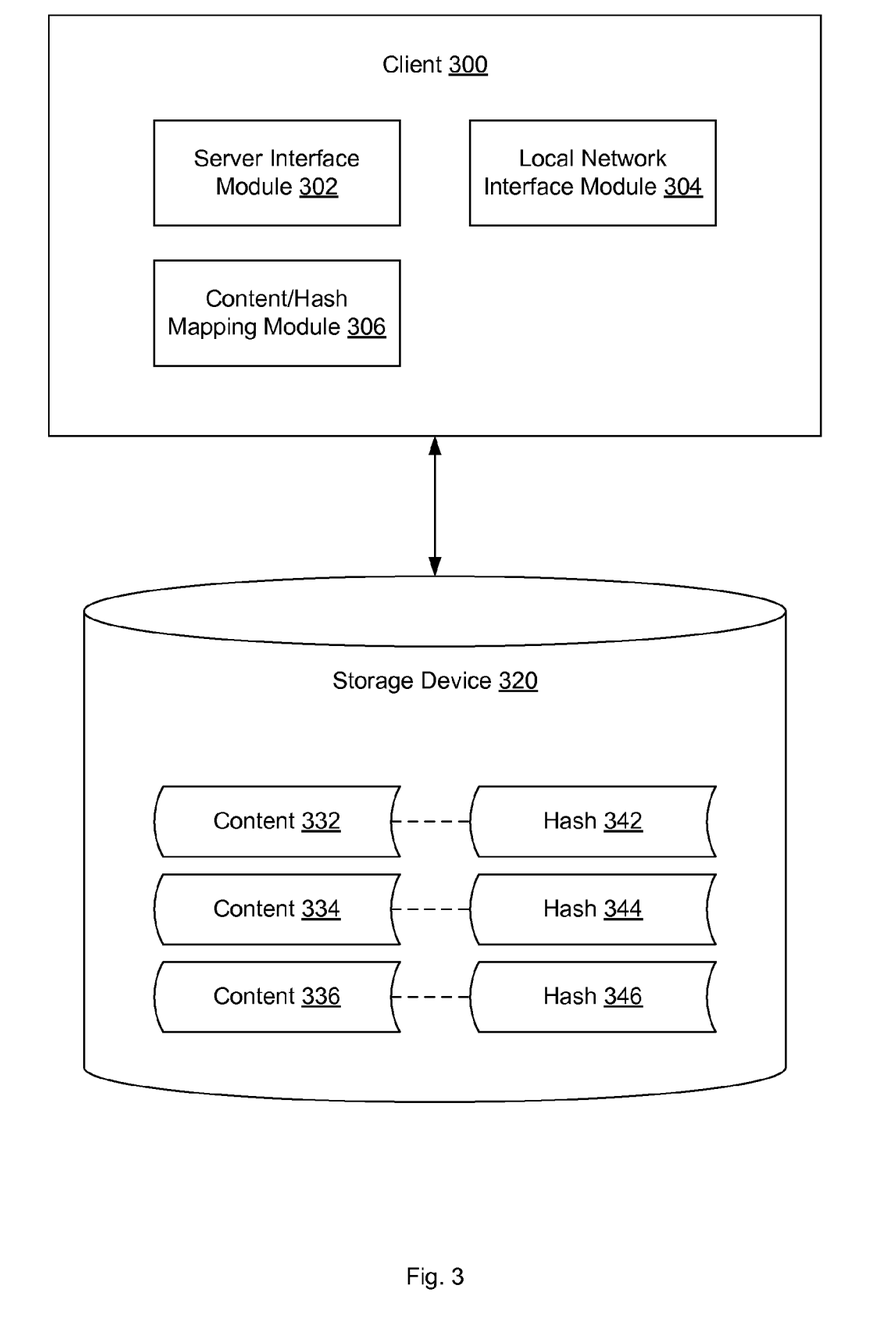
FIG. 3 is block diagram illustrating a client device for data distribution, according to an embodiment.

FIG. 3 is a block diagram illustrating a client device for data distribution, according to an embodiment of the present invention. In one embodiment, client device 300 is representative of any of networked client devices 130, 132, 134, as discussed above with respect to FIG. 1. In one embodiment, client device 300 includes server interface module 302, local network interface module 304, and content/hash mapping module 306. Client device 300 may be coupled to storage device 320 which includes content 332, 334, 336 and corresponding hashes 342, 344, 346. Storage device 320 may include mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

In one embodiment, server interface module 302 generates and sends a request for content or hashes to server 110. For example, if a user of client device 300 wants to obtain a piece of content, client device 130 may issue a request for a hash corresponding to the content. In response, server interface module 302 may receive the hash or a message indicating that the server 110 does not have the requested hash. If the server does not have the requested hash, server interface module 302 may request the actual content instead. Upon receiving either the hash or the corresponding content, server interface module 302 may store it in storage device 320 (e.g., as content 332 or hash 342).

In one embodiment, if server interface module 302 receives the requested hash from server 110, local network interface module 304 may broadcast a request for the corresponding content to other client devices located within the same local network (e.g., local network 138 between the first and second client devices). In response, local network interface module 304 may receive the requested content and store it in storage device 320 (e.g., as content 332, 334 or 336). This realizes a savings in bandwidth over the network 140 between server 110 and client device 300. In one embodiment, the local network 138 may have more available bandwidth and/or be faster, to improve the data transfer.

Similarly, local network interface module 304 may receive requests from other client devices in the local network for content corresponding to a certain hash. Content/hash mapping module 306 maintains a mapping between the actual content and the corresponding hash. So if the request specifies a particular hash 342, 344 or 346, content/hash mapping module 306 can identify the corresponding content 332, 334, 336, and local network interface module 304 can retrieve the content from storage device 320. Local network interface module 304 can then provide the content to the requesting client device. In addition, in one embodiment, when the client device 300 retrieves the hashes and the content, as described above, local network interface module 304 may notify a cache node 136 that the both content and hashes are available from client device 300. The cache node 136 may retrieve the hashes and content from the client device 300. The remaining clients on the local network, will then request the content from the cache node 136, after they have received the hashes from the content server 110.

Figure 4:
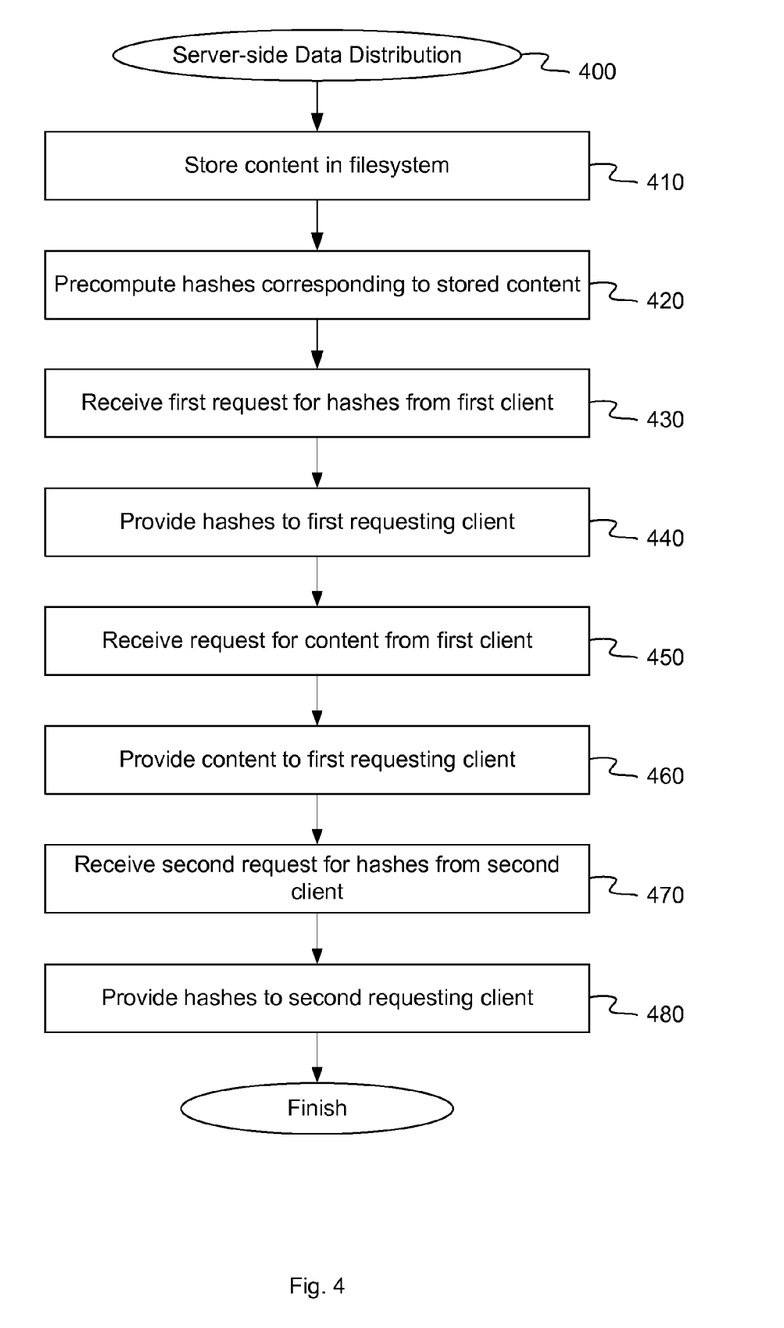
FIG. 4 is a flow diagram illustrating a method for server-side data distribution, according to an embodiment.

FIG. 4 is a flow diagram illustrating a method for server-side data distribution, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. The method 400 can precompute hashes for server content in order to improve data distribution. In one embodiment, method 400 may be performed by data distributor 112, as shown in FIGS. 1 and 2.

Referring to FIG. 4, at block 410, method 400 stores content in the filesystem. For example, as a part of a write operation, a processing device may store a piece of content 232 in a filesystem 230 maintained by server 110. The content may include data, such as web pages, software programs, software updates, media data, application data, or any other type of content. This content 232 may be made available to client devices, such as clients 130, 132, 134, connected to server 110 over a network 140. In one embodiment, the content 232 may be a chunk, or other sub-portion of an entire piece of data, such as a portion of a web page or a chunk of a media file, rather than the entire piece of data.

At block 420, method 400 precomputes hashes corresponding to the stored content. In one embodiment, hash computation module 202 of data distributor may compute a hash 242 corresponding to the stored content 232. In one embodiment, hash computation module 202 may compute the hash prior to a request for the content 232 being received from one of the networked client devices. For example, after the content 232 is stored in file system 230, hash computation module 202 may scan file system 230 for content that does not have an associated hash. Upon identifying content 232 as not having an associated hash, hash computation module 202 may generate the hash 242. In one embodiment, hash computation module 202 may identify blocks of data within content 232 having a fixed size (e.g., 64 kilobytes). For each block, hash computation module 202 may calculate a hash value 242 using a cryptographic hash algorithm. The corresponding hash 242 may also be stored in storage device 120.

At block 430, method 400 receives a first request for a hash from a first client. In one embodiment, client interface module 206 receives a request from a client 300 for the hash 242. At block 440, method 400 provides hashes to the first requesting client. In one embodiment, file system interface module 204 scans storage device 120 to determine if the hash 242 is present. If found, file system interface module 204 retrieves the hash 242 and provides a copy to client interface module 206. Client interface module 206 can provide the requested hash 242 to the client.

At block 450, method 400 receives a request for content from the first client. For example, the first client may have checked other local clients for a copy of the content corresponding to the hash 242, but since this is the first client to request the hash 242 or the content from server 110, none of the other clients will have the content. Thus, the client 300 may request the content directly from server 110. Client interface module 206 may receive the request. If the content on the server is changed (updated, replaced, etc.), then the hash may also change and the stored hash/content at the client side (on a client, or on a hosted cache server) may no longer be valid. This is just another scenario in which the client may find that the hash it received from the server does not map to a local copy of the content. In one embodiment, there are mechanisms by which outdated hash-to-content mappings are purged from the cache.

At block 460, method 400 provides the content to the first requesting client. In one embodiment, client interface module 206 can consult with content/hash mapping module 208. Content/hash mapping module 208 maintains a mapping between the actual content 232 and the corresponding hash 242. So if the request specifies a particular hash 242, content/hash mapping module 208 can identify the corresponding content 232, and file system interface module 204 can retrieve the content 232 from file system 230. Client interface module 206 can then return the requested content 232 to the client. At this point, the first client has a copy of the content 232 as well as the corresponding hash 242.

At block 470, method 400 receives a second request for hashes from a second client. In one embodiment, client interface module 206 receives a request from a second client for the hash 242. At block 480, method 400 provides the requested hash to the second requesting client. In one embodiment, file system interface module 204 scans storage device 120 to determine if the hash 242 is present. If found, file system interface module 204 retrieves the hash 242 and provides a copy to client interface module 206. Client interface module 206 can provide the requested hash 242 to the second client. Since the first client has the content 232 as well as the corresponding hash 242, the second client can request the content 232 directly from the first client. This can save bandwidth in the network 140 between server 110 and client device 300.

Figure 5:
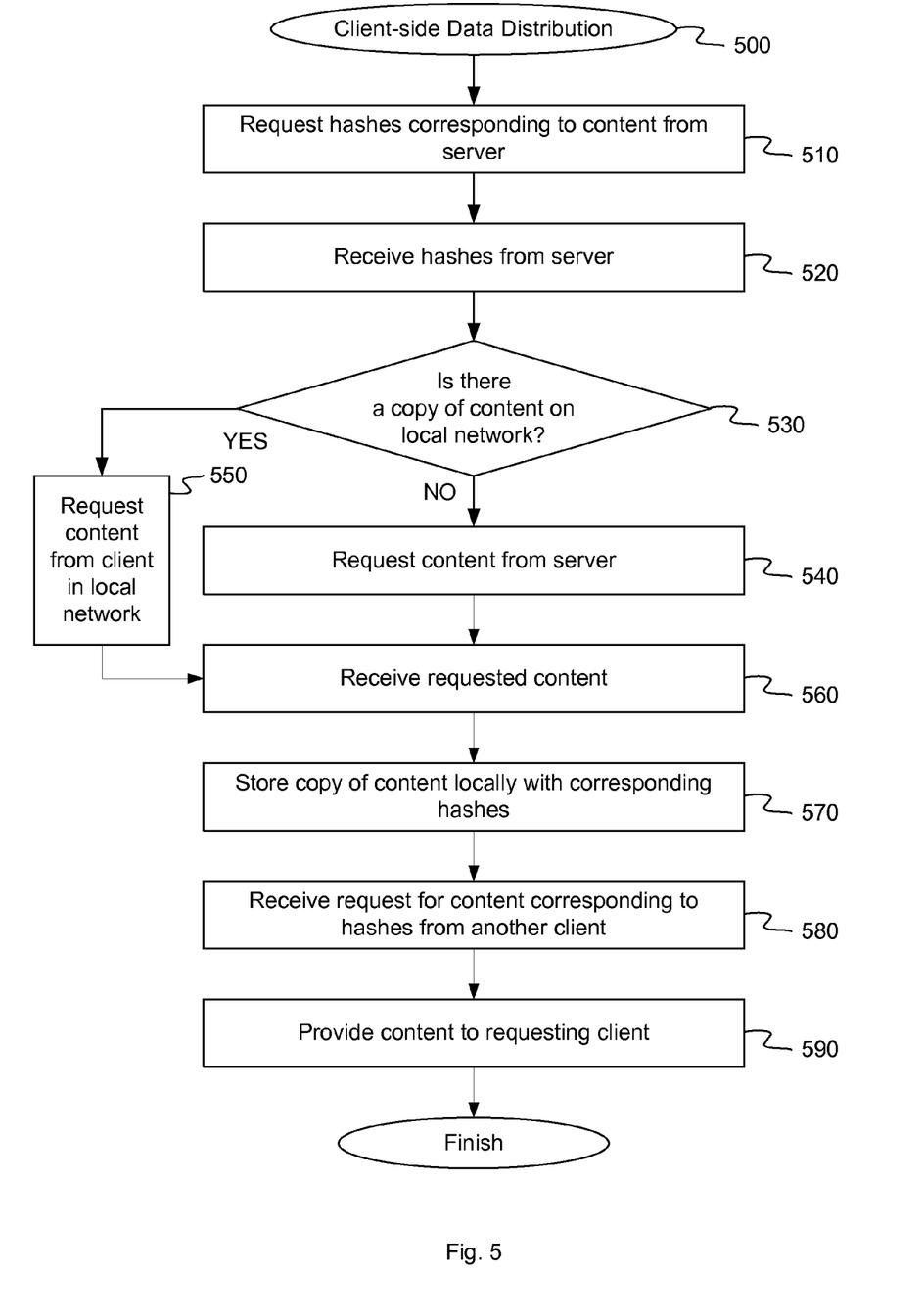
FIG. 5 is a flow diagram illustrating a method for client-side data distribution, according to an embodiment.

FIG. 5 is a flow diagram illustrating a method for client-side data distribution, according to an embodiment of the present invention. The method 500 may be performed by processing logic that comprises hardware (e.g., circuitry, dedicated logic, programmable logic, microcode, etc.), software (e.g., instructions run on a processing device to perform hardware simulation), firmware, or a combination thereof. The method 500 can make use of precomputed hashes for server content in order to improve data distribution. In one embodiment, method 500 may be performed by client device 300, as shown in FIG. 3.

Referring to FIG. 5, at block 510, method 500 requests a hash corresponding to a piece of content from a content server 110. In one embodiment, a user of client device 300 may issue a command to request the hash (e.g., through a user interface such as a web browser). In other embodiments, a computer application program running on client device 300 may initiate the request automatically. In one embodiment, server interface module 302 may generate the request for the hash and send the request to server 110 over network 140.

At block 520, method 500 receives the requested hash from the server. In response to the request, server interface module 302 may receive the requested hash from the server. In one embodiment, server interface module stores the hash 342 in connected storage device 320.

At block 530, method 500 determines if there is a copy of the content corresponding to the hash on another client device on the same local network. In one embodiment, local network interface module 304 may broadcast a request for the content corresponding to hash 342 to other client devices located within the same local network (e.g., local network 138). In one embodiment, the local client devices may return a response indicating whether or not they have a stored local copy of the content. In another embodiment, if the local client devices do not have the content, the local clients may not return any indication. In that case, if local network interface module 304 does not receive a response within a predetermined amount of time, local network interface module 304 may determine that none of the local clients have a copy of the content.

If at block 530, method 500 does not identify a local copy of the content, at block 540, method 500 can request the content from the server 110. In one embodiment, server interface module 302 can request the content directly from the server, which may be received over network 140.

If at block 530, method 500 identifies a local copy of the content, at block 550, method 500 can request the content from the client in the local network. Local network interface module 304 may issue the request to the local client that sent a message confirming that a copy of the content was present locally.

At block 560, method 500 receives the requested content from either the client in the local network or from the server. Either server interface module 302 or local network interface module 304 may receive the requested content. If client 300 can receive the content over the local network 138, this realizes a savings in bandwidth over the network 140 between server 110 and client device 300. In one embodiment, the local network 138 may have more available bandwidth and/or be faster, to improve the data transfer.

At block 570, method 500 stores a copy of the content locally with the corresponding hash or hashes. Either server interface module 302 or local network interface module 304 may store the received content in storage device 320 (e.g., as content 332). Content/hash mapping module 306 may maintain a mapping between the actual content 332 and the corresponding hash 342. In another embodiment, client device 300 may store the content in a separate cache node 136 connected to network 138. Cache node 136 may be a specialized computer or other device designed to maintain a copy of content 332 and hashes 342 that are received by client device 300 from content server 110.

At block 580, method 500 receives a request for the content corresponding to the hashes from another client in the local network. In one embodiment, local network interface module 304 may receive the requests from the other client device. Content/hash mapping module 306 maintains a mapping between the actual content and the corresponding hash. So if the request specifies a particular hash 342, 344 or 346, content/hash mapping module 306 can identify the corresponding content 332, 334, 336.

At block 590, method 500 provides the content to the requesting client. Local network interface module 304 can retrieve the content from storage device 320 and can then provide the content to the requesting client device.

Figure 6:
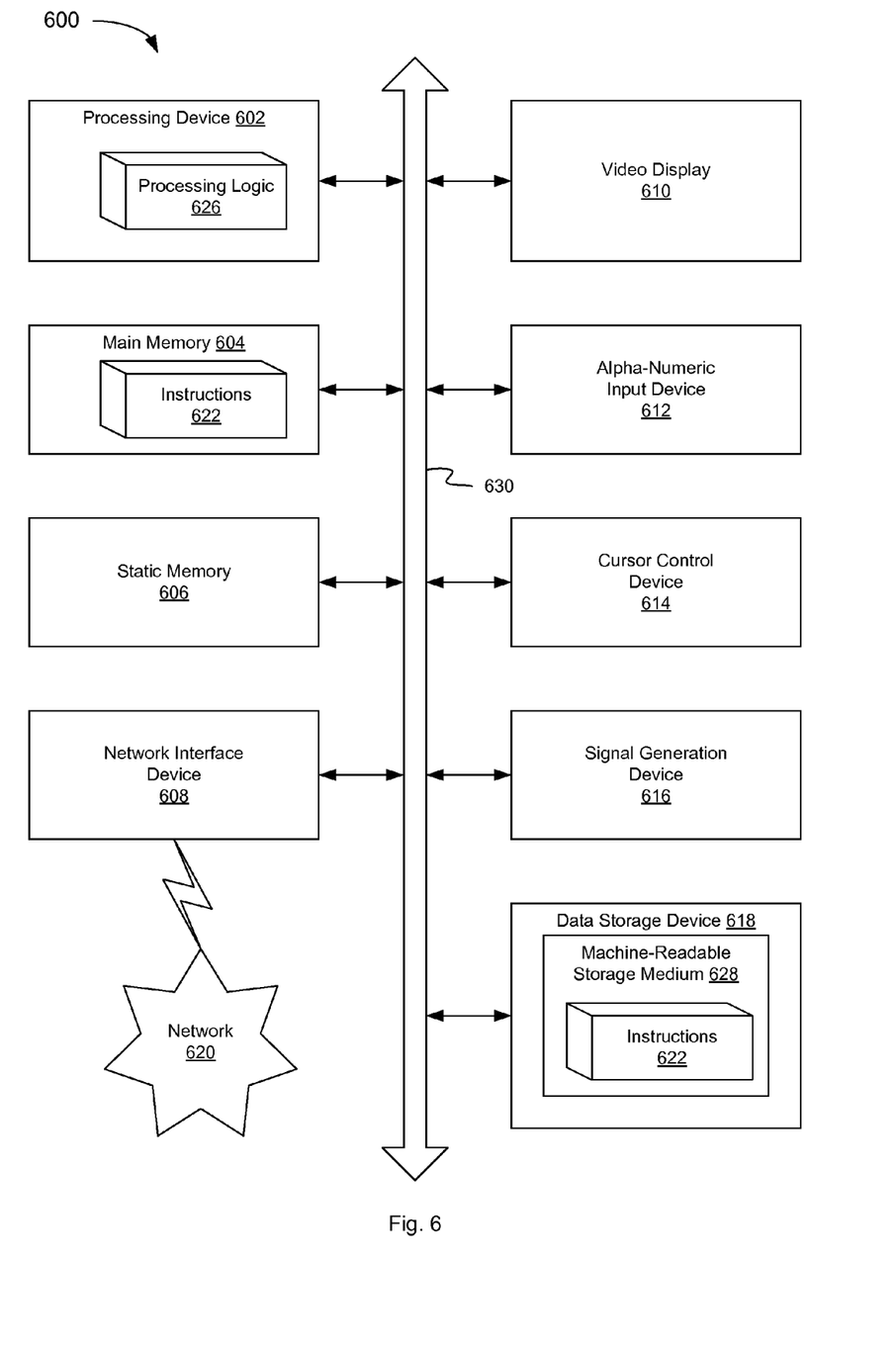
FIG. 6 is a block diagram illustrating one embodiment of a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as server 110 running data distribution module 112, or of a client, such as client 130, 132, 134.

The exemplary computer system 600 includes a processing device 602, main memory 604 (e.g., read-only memory (ROM), flash memory, dynamic random access memory (DRAM) (such as synchronous DRAM (SDRAM) or Rambus DRAM (RDRAM), etc.), static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions to perform a method for precalculating hashes to support data distribution, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that a certain operation may be performed, at least in part, concurrently with other operations. In another embodiment, instructions or sub-operations of distinct operations may be in an intermittent and/or alternating manner.

What is claimed is:

1. A method, comprising:
   storing content in a filesystem maintained by a server;
   dividing the content into one or more data blocks having a fixed size;
   periodically scanning the filesystem to detect one or more data blocks not having a corresponding hash value stored;
   in response to detecting one or more data blocks not having a corresponding hash value, precomputing, by a processing device, a hash value corresponding to each of the one or more data blocks of the content prior to receiving any requests for the hash value or the content;
   storing the hash value on the server;
   receiving, from a first client device, a request for a requested hash value;
   determining whether the requested hash value is present on the server; and in response to the requested hash value being present on the server, providing the requested hash value to the first client device, wherein the first client device is the first device to request the requested hash value after the content has been stored on the server;

receiving a request for the content corresponding to the requested hash value from the first client device;

providing the content to the first client device, the first client device to provide the requested hash value and the content to a cache node connected to the first client device over a local network connection;

receiving, from a second client device, a request for the requested hash value; and providing the requested hash value to the second client device, wherein the second client device to obtain the content from the cache node over the local network connection between the first and second client devices and the cache node.

2. The method of claim 1, wherein precomputing the hash value comprises applying a cryptographic hash function to the content to generate the hash value prior to receiving the request for the requested hash value from the first client device.

3. The method of claim 1, wherein the cryptographic hash function comprises at least one of a hash function, a fingerprinting function, or a checksum function.

4. The method of claim 1, wherein the hash value is computed after the content is stored in a file system by the server.

5. The method of claim 1, wherein the first client device and the second client device are within at least one of a same site, a same local area network, a routed network or a shared security domain.

6. The method of claim 1, wherein the local network connection between the first and second client devices and the cache node provides more bandwidth than a network connection between the server and the first client device.

7. A system comprising:
a memory; and
a processing device operatively coupled to the memory, the processing device to:
store content in a filesystem maintained by a server;
divide the content into one or more data blocks having a fixed size;
periodically scan the filesystem to detect one or more data blocks not having a corresponding hash value stored;
in response to detecting one or more data blocks not having a corresponding hash value, precompute a hash value corresponding to each of the one or more data blocks of the stored content prior to receiving any requests for the hash value or the content;
store the hash value on the server;
receive, from a first client device, a request for a requested hash value;
determine whether the requested hash value is present on the server; and
in response to the requested hash value being present on the server, provide the requested hash value to the first client device, wherein the first client device is the first device to request the requested hash value after the content has been stored on the server;
receive a request for the content corresponding to the requested hash value from the first client device;
provide the content to the first client device, the first client device to provide the requested hash value and the content to a cache node connected to the first client device over a local network connection;
receive, from a second client device, a request for the requested hash value; and
provide the requested hash value to the second client device, wherein the second client device to obtain the content from the cache node over the local network connection between the first and second client devices and the cache node.

8. The system of claim 7, wherein to precompute the hash value, the processing device to apply a cryptographic hash function to the content to generate the hash value prior to receiving the request for the requested hash value from the first client device.

9. The system of claim 7, wherein the cryptographic hash function comprises at least one of a hash function, a fingerprinting function, or a checksum function.

10. The system of claim 7, wherein the processing device to compute the hash value after the content is stored in a file system by the server.

11. The system of claim 7, wherein the first client device and the second client device are within at least one of a same site, a same local area network, a routed network or a shared security domain.

12. The system of claim 7, wherein the local network connection between the first and second client devices and the cache node provides more bandwidth than a network connection between the server and the first client device.

13. A non-transitory machine-readable storage medium storing instructions which, when executed, cause a processing device to:
store content in a filesystem maintained by a server;
divide the content into one or more data blocks having a fixed size;
periodically scan the filesystem to detect one or more data blocks not having a corresponding hash value stored;
in response to detecting one or more data blocks not having a corresponding hash value, precompute, by the processing device, a hash value corresponding to each of the one or more data blocks of the content prior to receiving any requests for the hash value or the content;
store the hash value on the server;
receive, from a first client device, a request for a requested hash value;
determine whether the requested hash value is present on the server; and
in response to the requested hash value being present on the server, provide the requested hash value to the first client device and to a networked cache node, wherein the first client device is the first device to request the requested hash value after the content has been stored on the server;
receive a request for the content corresponding to the requested hash value from the first client device;
provide the content to the first client device, the first client device to provide the requested hash value and the content to a cache node connected to the first client device over a local network connection;
receive, from a second client device, a request for the requested hash value; and
provide the requested hash value to the second client device, wherein the second client device obtains the content from the cache node over the local network connection between the first and second client devices and the cache node.

14. The non-transitory machine-readable medium of claim 13, wherein to precompute the hash value, the processing device to apply a cryptographic hash function to the content to generate the hash value prior to receiving the request for the requested hash value from the first client device.

15. The non-transitory machine-readable medium of claim 13, wherein the processing device to compute the hash value after the content is stored in a file system by the server.

16. The non-transitory machine-readable medium of claim 13, wherein the first client device and the networked cache node are within a shared security domain.

17. The non-transitory machine-readable medium of claim 13, wherein the local network connection between the first and second client devices and the cache node provides more bandwidth than a network connection between the server and the first client device.

* * * * *